United States Patent
Allen et al.

[15] 3,678,163

[45] July 18, 1972

[54] STABILIZED AQUEOUS SUSPENSION OF CALCIUM (-) (CIS-1,2-EPOXYPROPYL)-PHOSPHONATE

[72] Inventors: Donald J. Allen, Gwynedd; Joseph L. O'Neill, Lafayette Hill, both of Pa.

[73] Assignee: Merck & Co., Inc., Rahway, N.J.

[22] Filed: June 2, 1969

[21] Appl. No.: 829,785

[52] U.S. Cl. ............................................................424/203
[51] Int. Cl. ..........................................................A61u 27/00
[58] Field of Search..................................................424/203

[56] References Cited

UNITED STATES PATENTS 3,351,527  11/1967  Apat et al. ..............................424/271

OTHER PUBLICATIONS

Derwent Farmdoc No. 35,893, BE 718,507, pages 105–107 and 117–127

Primary Examiner—Stanley J. Friedman
Attorney—John Frederick Gerkens, J. Jerome Behan and I. Louis Wolk

[57] ABSTRACT

Stabilized aqueous suspensions of calcium (-) (cis-1,2-epoxypropyl)-phosphonate.

1 Claim, No Drawings

STABILIZED AQUEOUS SUSPENSION OF CALCIUM (-) (CIS-1,2-EPOXYPROPYL)-PHOSPHONATE

This invention relates to stabilized aqueous suspensions in an antibacterial agent. More particularly, it relates to aqueous suspensions of the potent antibiotic calcium (-)(cis-1,2-epoxypropyl)-phosphonate stabilized against particle size alteration by the use of particular surface active agents.

It has been discovered that (-)(cis-1,2-epoxypropyl)-phosphonic acid and its salts are useful antimicrobial agents, which are active in inhibiting the growth of both gram-positive and gram-negative pathogenic bacteria. Salts of (-)(cis-1,2-epoxypropyl)-phosphonic acid are useful in the treatment of diseases caused by bacterial infection in man and animals, and are particularly valuable in this respect, since they are active against resistant strains of pathogens.

The calcium salt of (-)(cis-1,2-epoxypropyl)-phosphonic acid has been found to be pharmaceutically acceptable and nontoxic when employed for combatting bacterial infections in man and lower animals. The salt may be administered orally in a dosage form such as capsules or tablets, or in a liquid solution or suspension. Alternatively, the calcium salt may be administered parenterally in solution or suspension by injection in a sterile vehicle.

In pharmaceutical suspensions, the drug particles are suspended in a saturated solution of the drug in the suspending medium and the fraction of the total drug which is in solution will depend to a large degree on the temperature of the suspension. Since a pharmaceutical suspension can be expected to be subjected to variations in temperature from the time it is manufactured until used, the drug will be subject to dissolution before ultimate use. One result of this crystallization process is that the suspended drug particles are subject to substantial increase in their size and change in shape. Such changes in size and shape of suspended particles invariably lead to deterioration of the suspension, both in terms of its physical stability and aesthetical appearance.

In general, the solubility of most substances increases with temperature. Consequently, if the temperature of a suspension was lowered, one would expect the fraction of drug in solution to decrease. This decrease in the fraction in suspension is manifested by enlargement of the suspended drug particles and frequently by a change in their shape. Calcium (-)(cis-1,2-epoxypropyl)-phosphonate is an atypical compound in that its equilibrium solubility decreases with an increase in temperature as is shown in Table 1.

TABLE 1
Solubility of Calcium (—) (Cis-1,2-Epoxypropyl)-Phosphonate

| Temperature °C. | mg./ml. |
| --- | --- |
| 25 | 4.0 |
| 37 | 3.3 |
| 50 | 2.4 |
| 60 | 1.7 |

As a result of the inverse solubility behavior of calcium (-)(cis-1,2-epoxypropyl)-phosphonate, when aqueous suspensions containing up to 352.5 mg. drug per ml. are heated from 25° to 40°C., the suspended particles increase in size from 10 to 200$\mu$. The overall effect of this behavior is that aqueous suspensions of the antibiotic agent tend to deteriorate both in terms of physical stability and appearance.

One object of the present invention is the preparation of aqueous suspensions of calcium (-)(cis-1,2-epoxypropyl)-phosphonate stabilized against particle size deterioration.

The present invention is based upon the discovery that aqueous pharmaceutical suspensions of calcium (-)(cis-1,2-epoxypropyl)-phosphonate can be stabilized against alteration as a result of particle size growth due to variation in temperature by addition of certain additives to the suspension. It has been discovered that the presence of low concentrations of a combination of lecithin, Polysorbate 80, and sodium carboxymethylcellulose in aqueous solutions of the calcium salt, allow such suspensions to be heated and cooled without any appreciable change in particle size of the suspended material. Aqueous suspensions of the calcium salt containing the particular combination of surface active agents can be heated to 121°C. and cooled to −20°C. with no measurable change in particle size when observed microscopically.

The pharmaceutical suspensions of the present invention contain from 0.5 to 50 percent of calcium (-)(cis-1,2-epoxypropyl)-phosphonate, 0.05 to 1.0 percent sodium carboxymethyl-cellulose, 0.1 to 1.0 percent lecithin, and 0.05 to 5 percent Polysorbate 80. The preferred ratio of components of the stabilized suspensions of this invention is 2.8 to 35.2 percent calcium (-)(cis-1,2-epoxypropyl)-phosphonate, 0.4 to 0.7 percent sodium carboxymethylcellulose, 0.5 to 0.6 percent lecithin, and 0.4 to 1.25 percent Polysorbate 80.

The calcium (-)(cis-1,2-epoxypropyl)-phosphonate salt may be administered alone or in combination with other biologically active ingredients and especially with other antibacterial agents such as erythromycin, benzathine penicillin, chloramphenicol, and calcium tetracycline. In addition, suspensions of the calcium salt may also contain other salts of (-)(cis-1,2-epoxypropyl)-phosphonic acid, such as mono- and di-sodium salts, monosodium monopotassium, magnesium, aluminum, and amine salts thereof.

When aqueous suspensions of calcium (-)(cis-1,2-epoxypropyl)-phosphonate are used for combatting bacterial infections in man and lower animals, they may be administered orally or parenterally. These formulations can be prepared using suitable diluents, extenders, preservatives, and flavoring agents known to those skilled in the art.

Good results are obtained in the treatment and control of bacterial infections in animals and adult humans by administration of from about one-fourth to 4 gm./day of (-)(cis-1,2-epoxypropyl)-phosphonic acid equivalent. It will, of course, be understood that the optimum dose in any given instance will depend upon the type and severity of infection to be treated, and that smaller doses will be employed for pediatric use, all of such adjustments being within the skill of the practitioner in the field.

The best mode contemplated by the applicants for carrying out their invention is more fully illustrated in the following examples. It is to be understood that no limitation is implied or intended except as set forth in the appended claims.

EXAMPLE 1

Sterile, isotonic, aqueous suspensions of calcium (-)(cis-1,2-epoxypropyl)-phosphonate suitable for parenteral administration are prepared in the following manner:

| Ingredients | Concentration mg./ml. | | |
| --- | --- | --- | --- |
| Calcium (-)(cis-1,2-epoxypropyl)-phosphonate | 14.1 | 176.25 | 352.5 |
| Sodium carboxymethylcellulose | 5 | 7 | 7 |
| Lecithin | 5 | 6 | 6 |
| Polysorbate 80 | 2 | 5 | 5 |
| Calcium chloride | 6.6 | 6.6 | 6.6 |
| Benzyl alcohol | 9 | 9 | 9 |
| Water-for-injection q.s. ad | 1.0 ml. | 1.0 ml. | 1.0 ml. |

In the above formulations, the calcium (-)(cis-1,2-epoxypropyl)-phosphonate is added to a solution of sodium carboxymethylcellulose and the mixture agitated to completely wet the calcium salt. A colloidal dispersion of the lecithin is added followed by the Polysorbate 80, calcium chloride, and the benzyl alcohol. The formula is brought to volume with water for injection. The suspensions are subject to autoclaving at 121°C. to effect sterilization. After sterilizing the suspension, no change is observable in size or shape of suspended particles of calcium (-)(cis-1,2-epoxypropyl)-phosphonate from that of the calcium salt originally incorporated into the formulation at ambient temperature. When samples of the suspensions are heated to 121°C. and cooled to −20°C. then rewarmed to room temperature, no physical change in particle size of suspended material is observed upon microscopic examination.

EXAMPLE 2

An aqueous suspension of calcium (-)(cis-1,2-epoxypropyl)-phosphonate is prepared using the same ingredients, proportions and procedure as Example 1 except sodium chloride is used in place of calcium chloride. When the resulting suspension is subjected to the sterilization procedure, no physical change in particle size is observed upon microscopic examination.

EXAMPLE 3

Aqueous suspensions of calcium (-)(cis-1,2-epoxypropyl)-phosphonate suitable for ophthalmic use are prepared in the following manner:

| Ingredients | Concentration mg./ml. | | |
| --- | --- | --- | --- |
| Calcium (-)(cis-1,2-epoxypropyl)-phosphonate | 14.1 | 176.25 | 352.5 |
| Sodium carboxymethylcellulose | 5 | 7 | 7 |
| Lecithin | 5 | 6 | 6 |
| Polysorbate 80 | 2 | 5 | 5 |
| Calcium chloride | 6.6 | 6.6 | 6.6 |
| Phenethyl alcohol | 5 | 5 | 5 |
| Water-for-injection q.s. ad | 1.0 ml. | 1.0 ml. | 1.0 ml. |

In the above formulations, the active component is added to a solution of sodium carboxymethylcellulose and the mixture agitated to wet the calcium salt. A colloidal dispersion of lecithin is added followed by the Polysorbate 80, calcium chloride and the phenethyl alcohol. The formula is brought to volume with water. The suspensions are sterilized by autoclaving at 121°C. with no physical change in particle size observed upon microscopic examination.

EXAMPLE 4

An aqueous suspension of calcium (-)(cis-1,2-epoxypropyl)-phosphonate is prepared using the same ingredients, proportions and procedure as Example 3 except benzyl alcohol is used in place of phenethyl alcohol. When the ophthalmic suspension is subjected to heating to 121°C. and cooled to −20°C. then rewarmed to room temperature, no physical change in particle size of suspended material is observed.

EXAMPLE 5

Aqueous suspensions of calcium (-)(cis-1,2-epoxypropyl)-phosphonate suitable for oral administration are prepared in the following manner:

| Ingredients | Concentration mg./5 ml. | | |
| --- | --- | --- | --- |
| Calcium (-)(cis-1,2-epoxypropyl-phosphonate | 141 | 352.5 | 705 |
| Sodium carboxymethylcellulose | 15 | 20 | 20 |
| Lecithin | 15 | 20 | 20 |
| Polysorbate 80 | 15 | 25 | 50 |
| Sorbitol Solution 70% | 1500 | 1500 | 1500 |
| Sorbic Acid | 5 | 5 | 5 |
| Methylparaben | 6 | 6 | 6 |
| Propylparaben | 1 | 1 | 1 |
| Purified Water q.s. ad | 5 ml. | 5 ml. | 5 ml. |

In the above formulations, the calcium (-)(cis-1,2-epoxypropyl)-phosphonate is added to a solution of sodium carboxymethylcellulose and sorbitol solution 70 percent, and the mixture is agitated to completely wet the calcium salt. A dispersion is added containing the lecithin followed by the Polysorbate 80. A solution of the sorbic acid, methylparaben, and propylparaben is added. The formula is brought to volume with purified water.

EXAMPLE 6

Sterile aqueous suspensions of calcium (-)(cis-1,2-epoxypropyl)-phosphonate with disodium (-)(cis-1,2-epoxypropyl)-phosphonate in solution suitable for parenteral administration are prepared in the following manner:

| Ingredients | Concentration mg./ml. | |
| --- | --- | --- |
| Calcium (-)(cis-1,2-epoxypropyl)-phosphonate | 88.1 | 264.4 |
| Disodium (-) (cis-1,2-epoxypropyl)-phosphonate | 83.7 | 83.7 |
| Sodium carboxymethylcellulose | 1.75 | 1.75 |
| Lecithin | 4 | 4 |
| Polysorbate 80 | 10 | 12.5 |
| Benzyl Alcohol | 9 | 9 |
| Water for Injection q.s. ad | 1.0 ml. | 1.0 ml. |

In the above formulations, the calcium (-)(cis-1,2-epoxypropyl)-phosphonate is added to a solution of sodium carboxymethylcellulose, and the mixture is agitated to completely wet the calcium salt. A dispersion of the lecithin is added followed by the polysorbate 80 and the benzyl alcohol. The suspensions are sterilized by autoclaving at 121°C. The disodium (-)(cis-1,2-epoxypropyl)-phosphonate is dissolved in water for injection and this solution is sterilized by filtration. The filtrate is aseptically combined with the suspension. The sterile suspension is brought to volume aseptically with sterile water for injection.

Polysorbate 80 is a complex mixture of polyoxyethylene ethers of mixed partial oleic esters of sorbitol anhydride; it is a viscous liquid with a density 1.06–1.10 and viscosity 270–430 centistokes.

What is claimed is:

1. The antibacterial pharmaceutical composition stabilized against particle size alteration comprising 2.8 to 35.2 calcium (-) (cis-1,2-epoxypropyl)-phosphonate, 0.4 to 0.7 percent sodium carboxymethylcellulose, 0.5 to 0.6 percent lecithin, and 0.4 to 1.25 percent a complex mixture of polyoxyethylene ethers of mixed partial oleic esters of sorbitol anhydride having a density of 1.06–1.10 and a viscosity of 270–430 centistokes.

* * * * *